Figure 1:
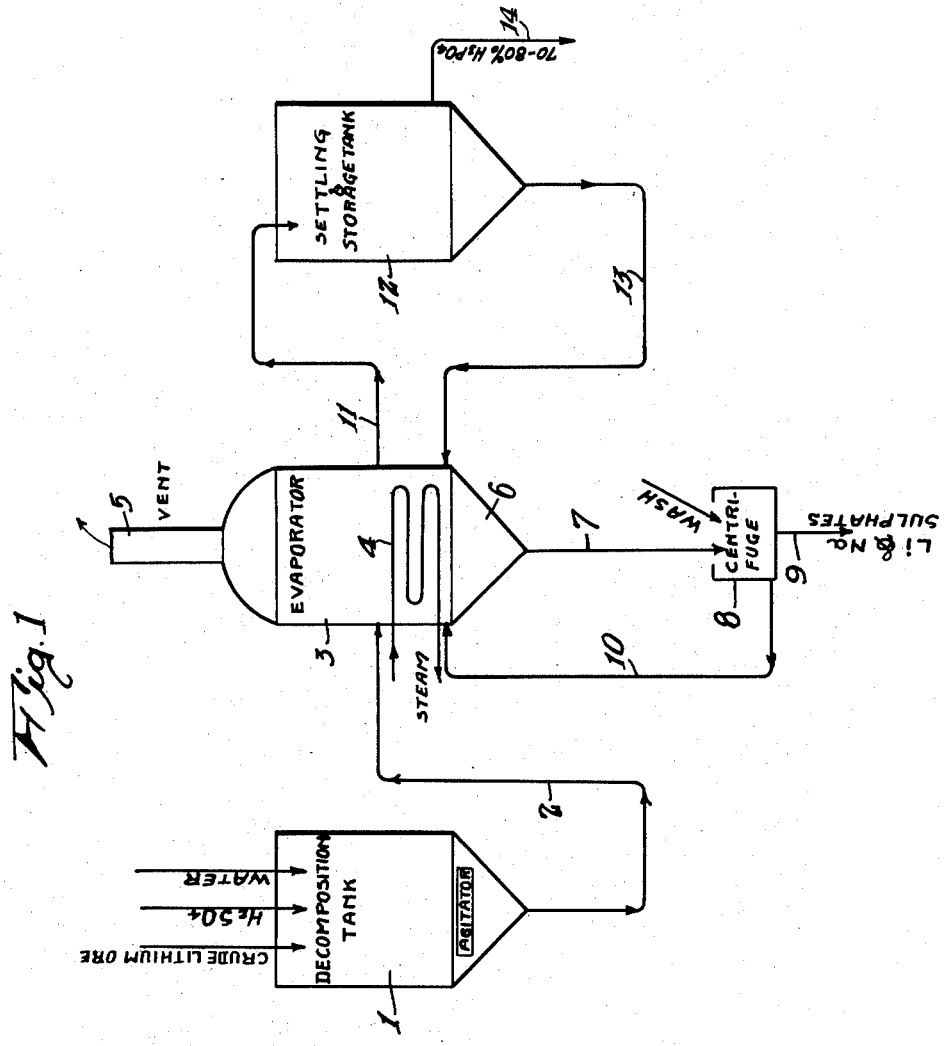

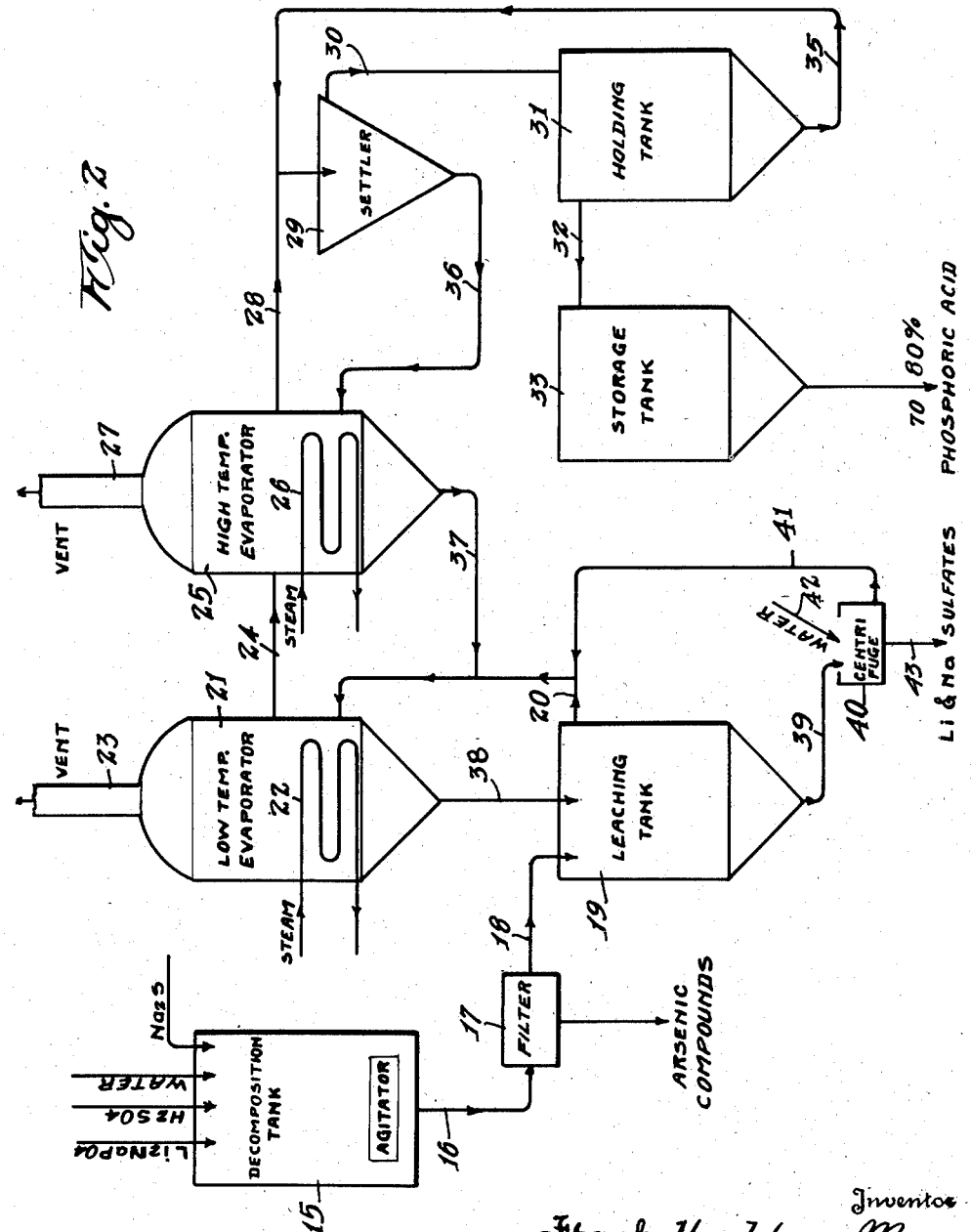

Patented Aug. 26, 1952

2,608,465

UNITED STATES PATENT OFFICE 2,608,465

PROCESS OF PRODUCING LITHIUM SULFATE FROM LITHIUM PHOSPHATES

Frank Henderson May, Trona, Calif., assignor to American Potash & Chemical Corporation, Trona, Calif., a corporation of Delaware Application October 28, 1946, Serial No. 706,248

6 Claims. (Cl. 23—121)

This invention relates to a process for producing lithium sulfate from a lithium phosphate. The lithium phosphates employed may be either the trilithium phosphate ($Li_3PO_4$) or a lithium phosphate double salt, such as dilithium-sodium phosphate ($Li_2NaPO_4$), or mixtures of the same containing sodium phosphate. The lithium sulfate produced by the process of the present invention may be either the pure lithium sulfate monohydrate ($Li_2SO_4.H_2O$), or mixtures of the pure lithium sulfate monohydrate ($Li_2SO_4.H_2O$) with the anhydrous double salt lithium-sodium sulfate ($Li_2SO_4.Na_2SO_4$), or the anhydrous double salt ($Li_2SO_4.Na_2SO_4$) alone, or mixtures of this double salt with anhydrous sodium sulfate ($Na_2SO_4$)—all of such materials being included within the meaning of the term "lithium-sulfate materials" as herein used.

The process of this invention has been particularly applied to an impure dilithium-sodium phosphate ($Li_2NaPO_4$), a byproduct of the heavy chemicals plant of the American Potash & Chemical Corporation at Trona, California. This dilithium-sodium phosphate contains as its principal impurities certain amounts of sodium carbonate and sodium sulfate. A representative analysis is shown herewith:

| | Per cent |
|---|---|
| $Li_2O$ | 20.5 |
| $Na_2O$ | 22.5 |
| $P_2O_5$ | 46.5 |
| $CO_2$ | 2.5 |
| $SO_3$ | 1.0 |
| $H_2O$ and minor impurities | 7.0 |

It is the general object of the present invention to provide a new and useful and economical process for the production of lithium sulfate relatively free from all impurities apart from sodium sulfate.

A further object of the present invention is to provide a process of producing a lithium sulfate in which the losses of lithium are reduced to a minimum, or, at least theoretically, entirely avoided.

A further object of the present invention is to provide a process of producing essentially pure orthophosphoric acid as a byproduct.

The process of the present invention is based on my discovery that the normal sulfates of lithium and sodium and the anhydrous double salt of lithium and sodium sulfate will precipitate from a phosphoric acid solution. This discovery is contrary to any normal expected result, since normally it would be expected that only acid salts, such as lithium or sodium acid sulfate, or lithium or sodium acid phosphate would be precipitated from a phosphoric acid solution. I have found, however, that pure lithium sulfate monohydrate ($Li_2SO_4.H_2O$) will precipitate when the material processed is substantially free of sodium compounds. When the material treated is a mixture of lithium and sodium phosphate, or a double salt of the same, or contains sodium sulfate as its impurity, there is precipitated from the phosphoric acid solution, when the material is rich in lithium, a mixture of lithium sulfate monohydrate ($Li_2SO_4.H_2O$)

and the anhydrous double salt lithium-sodium sulfate ($Li_2SO_4.Na_2SO_4$). On the other hand, if the original material is lean in lithium, it may be precipitated in the phosphoric acid solution in a mixture of anhydrous sodium sulfate ($Na_2SO_4$) and the double salt lithium-sodium sulfate ($Li_2SO_4.Na_2SO_4$), or of the double salt alone. When the material processed is the dilithium-sodium phosphate ($Li_2NaPO_4$) obtained from the plant of the American Potash & Chemical Corporation, heretofore referred to, the product consists of a mixture of lithium sulfate monohydrate and the double salt lithium-sodium sulfate. As hereinbefore stated, lithium sulfate or any mixture or double salt of lithium sulfate with sodium sulfate will be included in the meaning of the term "lithium-sulfate materials."

The precipitation of the lithium-sulfate materials may take place from phosphoric acid solutions ranging from dilute solutions to solutions having concentrations as high as 80% of phosphoric acid ($H_3PO_4$) or higher.

In the process of the present invention, the lithium-phosphate material to be treated is first reacted with sulfuric acid in the presence of water. The sulfuric acid is employed to provide, on the one hand, the necessary sulfate radicals to convert the lithium phosphate or any sodium phosphates present into corresponding lithium-sulfate materials while, on the other hand, liberating and producing phosphoric acid in solution. In the preferred process, the sulfuric acid is used in just the sufficient quantity that is necessary to produce the desired sulfate. Any additional sulfuric acid would contaminate the phosphoric acid byproduct of the process, while too little sulfuric acid would result in a decrease in the yield of the process per cycle and would increase the recycling load of lithium with a consequent probable increase in the lithium losses. It is preferable to err, if at all, on the side of using too little sulfuric acid rather than too much.

The process of the present invention includes two alternate forms. On one of these forms of the process, the lithium or lithium-sodium-phosphate material is reacted with the sulfuric acid, using insufficient water, or recycling liquors containing water, to dissolve the lithium-sulfate materials produced. In this form of the process, there may be originally produced a slurry of the sulfate and liquor which may be too thick to be handled by pumps or other slurry-moving equipment. This slurry may then be thinned down by the addition of water in an amount insufficient to dissolve the precipitated salt but sufficient to render the slurry produced more readily handled. In lieu of using water in this thinning operation, the process may, as hereinafter pointed out, utilize a recycling liquor containing lithium values, or any other liquor containing lithium values to be recovered.

When lithium-sulfate materials are precipitated as a slurry during reaction of the phosphate material with sulfuric acid, salts are precipitated in a form in which the crystals are very fine and rather hard to filter from the residual solution. It is also difficult to wash the crystals of the sulfate materials produced in this manner free of the entrained mother liquor. By this form of the process, therefore, the sulfate materials produced may contain as an impurity appreciable quantities of phosphoric acid resulting in a poor separation of the lithium from the phosphate and in a reduction of the yield of the phosphoric acid byproduct.

In the alternate form of the process, there is added sufficient water at the start of the process to dissolve all the lithium-sulfate materials which are formed by the reaction of the sulfuric acid with the lithium and sodium phosphate used. This water may be present all or in part in liquors containing lithium values and may be in the form of recycling liquors. The resulting liquor may then be evaporated to remove the excess water and to crystallize the desired sulfate materials which, in this form of the process, are produced as large crystals which are easy to filter and wash free of entrained mother liquor. This present form of the process also has the advantage that various impurities may be removed from the material undergoing treatment previous to the precipitation of the crystals of the desired lithium-sulfate materials. It is often true that the lithium or sodium phosphate, which is to be treated, contains insoluble impurities or soluble impurities which can be easily precipitated. The insoluble impurities may be readily filtered from the solution before the evaporation stage, and soluble impurities can be easily precipitated from the solution by different reactions. For these reasons the second form of the process of the present invention is generally found preferable.

Whether the decomposition step is carried out so as to produce a slurry as described in the first embodiment of the invention mentioned, or to produce a clear solution as in the second, or preferred embodiment described, the resulting phosphoric acid solution is subject to the evaporation step. By evaporating the solution, I not only precipitate more of the desired lithium-sulfate materials in the case of the first form of the invention, and all of the lithium-sulfate materials in the second form of the invention, but I also concentrate the phosphoric acid produced.

In the first form of my invention, this evaporation step is generally preceded by a separation of the sulfate materials produced in the decomposition step from the solution.

As previously described, the crystals formed in the decomposition step in the first embodiment of the invention are found hard to filter and hard to wash free of impurities. This condition is considerably aggravated by the high viscosity of the phosphoric acid solution. Accordingly, I have discovered that decantation of the solution from the slurry is more economical. The separation is preferably effected by allowing the slurry to settle and withdrawing the major portion of the phosphoric acid solution from the settled solids. It is this decanted solution which is introduced into the evaporation step.

To reduce the viscosity of the solution still remaining with the solid, I then add to the residue of solid and liquor from the decanting step, a liquid chemically inert to the various compounds present and in which the solids are not soluble but with which the water and phosphoric acid are miscible in all proportions. A suitable liquid for this purpose is methyl alcohol. By the addition of methyl alcohol, the viscosity of the liquor is greatly reduced, improving the filtration characteristics. Moreover, the solids may be readily washed by the use of additional quantities of methyl alcohol.

The methyl alcohol used in the process may be readily recovered for re-use. For this purpose the methyl alcohol-water-phosphoric acid mixture produced on separation from the solid is introduced into an evaporator equipped with a fractionating column and a condenser. By fractional distillation, I recover a substantial percentage of the methyl alcohol. The water-phosphoric acid mixture resulting from the fractionation-distillation step may be introduced into the evaporation step in which the clear liquor from the decomposition step is processed. This evaporation step may be carried out until there is produced a concentrate of about 70% orthophosphoric acid ($H_3PO_4$) or better.

At these concentrations, the phosphoric acid solution will boil at a temperature of over 160° C. By concentrating the phosphoric acid solution as described, the amount of sulfate retained in the phosphoric acid byproduct is reduced to a minimum.

I have further discovered that the crystals of the lithium-sulfate materials precipitated during the evaporation of dilute phosphoric acid solutions are larger than those precipitated during the evaporation of the more concentrated phosphoric acid solutions. Moreover the viscosity of phosphoric acid solutions rises rapidly as the concentration is increased. Since it is preferable to produce large crystals and also preferable to concentrate the phosphoric acid solution, I have devised a process of evaporation which is carried out in two steps to attain these ends.

In the first step, evaporation proceeds at or to a temperature of 120° C., where there is obtained the desired relatively large-sized crystals of the lithium-sulfate materials. This corresponds to a concentration of phosphoric acid of from 35–40%. The solution from this evaporation step is subject to the second evaporation step, in which the temperature is carried out to over 160° C., or to a concentration of phosphoric acid over 70%. In this second evaporation step there are formed small crystals of the desired sulfate materials. These small crystals are returned from the second evaporation step to the first step, where the small crystals tend to grow in size.

The desired product of large crystals might be filtered directly from the slurry in the first evaporation step but I find it preferable to reduce the viscosity of the liquor in this slurry by counterwashing the slurry with the relatively dilute solution obtained in the preferred decomposition step.

If it should be desired to separate the crystals of sulfate materials produced from the evaporation step directly from the concentration phosphoric acid solution produced, this separation can be aided by the procedure of first settling the sulfate, decanting the clear phosphoric acid solution, diluting the settled slurry with a medium such as methyl alcohol in which the water and phosphoric acid are soluble but in which the sulfates are not soluble, and then proceeding with the filtration and separation of the crystals of sulfate material from the alcohol-containing solution, followed by the eventual recovery of the alcohol by fractional distillation. The liquor remaining after the recovery of the methyl alcohol may be returned to the evaporation step.

The phosphoric acid leaving the evaporation step is relatively free of sulfates. However, I have discovered that lithium-sulfate materials crystallize but slowly from concentrated phosphoric acid solutions as their solubilities approach equilibrium. I therefore direct the acid discharged from the evaporation step to a holding tank wherein the phosphoric acid is held and permitted to cool. Within this tank the last remaining quantity of sulfate materials which will precipitate is precipitated. These lithium-sulfate materials are in the form of small crystals and these are returned to the evaporation step to permit them to grow. The clear phosphoric acid remaining is directed to a storage tank from which it can be taken for sale or for use in the manufacture of phosphate salts. If used in the manufacture of phosphate salts, the mother liquors can be returned to the decomposition step of my invention for the recovery of phosphoric acid and of the small amounts of lithium-sulfate materials which accompany the phosphoric acid as an impurity.

The lithium-sulfate materials from my preferred process are filtered in a dewatering device. I prefer to use a centrifugal for filtering although my invention is not limited to the use of a centrifugal. The sulfate materials are washed with water within the centrifugal and are then discharged therefrom. The filtrate from the centrifugal, including the wash water, is introduced into the low-temperature evaporator.

When the process is applied to the dilithium-sodium phosphate byproduct from the plant of the American Potash & Chemical Corporation, the lithium-sulfate materials obtained after drying, have the following average composition:

| | Per cent | | Per cent |
|---|---|---|---|
| $Li_2SO_4$ | 52.56 | $P_2O_5$ | 0.20 |
| $Na_2SO_4$ | 44.24 | $H_2O$ | 3.00 |

Now referring to the accompanying drawings, I have illustrated diagrammatically the general and the preferred forms of the invention.

In the drawings:

Figure 1 diagrammatically illustrates the general embodiment of the invention, while Figure 2 represents the preferred form of the invention.

Referring first to Figure 1 of the drawings, the following processes and apparatus are used in the general form of my invention:

The decomposition tank 1 is equipped with an agitator. In this tank are mixed the crude materials containing lithium and phosphate, the sulfuric acid, and water, and within the tank the raw material is decomposed. After decomposition, the solution in the decomposition tank 1 is made to flow by some means, such as pipe 2, into the evaporator 3. The evaporator is heated by some known method, such as a steam coil 4, and vapors are allowed to escape through vent 5. Lithium-sulfate materials collect in the lower part 6 of the evaporator, which is quiescent, and are removed through some suitable means, such as pipe 7 to a filtering device 8. The cake in the filter is washed and is then discharged as indicated by arrow 9. The filtrate is returned through some means, such as pipe 10, to the evaporator for further concentration of the liquid phase. When the liquid phase in the evaporator reaches a concentration of 70–80% $H_3PO_4$, it is diverted through some means, such as pipe 11 to a settling and storage tank 12. Any lithium-sulfate materials precipitating or settling in the settling and storage tank 12 are returned to the evaporator by some means such as pipe 13 while the clear 70–80% phosphoric acid may be removed through pipe 14 for sale or use in other processes.

The operation of the preferred embodiment of the invention is illustrated diagrammatically in Fig. 2. In connection with this figure, I have described the operation of the process as ordinarily applied to the treatment of crude dilithium-sodium phosphate.

I decompose dilithium-sodium phosphate in the decomposition tank 15 with sulfuric acid and sufficient water to dissolve all solids formed. To this decomposition tank 15, I add a reagent to precipitate undesirable impurities, such as arsenic compounds. Such a reagent might be sodium sulfide or hydrogen sulfide. I then send the solution containing the precipitated solids through pipe 16 to a filter 17 wherein I remove the undesirable solids. The clear liquor then proceeds through pipe 18 to the leaching tank 19. Within the leaching tank 19 this clear liquor encounters the slurry discharged from the low-temperature evaporator and dilutes the liquid phase of this slurry, thus reducing its viscosity. The leaching tank 19 is of sufficient size that the solid phase of the slurry settles to the bottom while the relatively clear overflow proceeds through pipe 20 to the low-temperature evaporator 21. The evaporation proceeds by some means, such as by steam coil 22, while precipitating lithium-sulfate materials. Water vapors leave the evaporator through vent 23. The temperature of the evaporator 21 depends upon the concentration of the phosphoric acid in the liquid phase. I control the steam to coil 22 and I adjust the removal of the liquid phase through pipe 24 to maintain a temperature of approximately 120° C. in the low-temperature evaporator 21. The liquid phase, containing some solids, is removed through pipe 24, and introduced into the high-temperature evaporator 25. This evaporator is also heated by some means, such as a steam coil 26. Lithium-sulfate materials precipitate in the evaporator and water vapors are removed through vent 27. I control the steam to and the outflow of liquor from this evaporator 25 to maintain a temperature above 160° C. The liquid phase containing some solids is removed through pipe 28 to a settler 29. Within this settler the solids separate from the liquid and the clear liquid overflows through pipe 30 to holding tank 31. Some precipitation of lithium-sulfate materials continues as the phosphoric acid in the holding tank cools. When all solids have settled from the phosphoric acid in the holding tank, I send the clear acid through pipe 32 to a storage tank 33, from where it may be taken directly for sale or for use in the production of phosphates.

Solids settling in the holding tank 31 are returned through pipe 35 to settler 29. These solids, together with the solids entering the settler through pipe 28 with the liquid phase from the high-temperature evaporator 25, are removed from settler 29 through pipe 36 and returned to the high-temperature evaporator 25. Lithium-sulfate materials crystallizing from solution in high-temperature evaporator 25 and returning from settler 29 are removed from the high-temperature evaporator 25 through pipe 37 and are introduced into low-temperature evaporator 21. Lithium-sulfate materials crystallizing in the low-temperature evaporator 21 and sulfate materials returning through pipe 37 from the high-temperature evaporator 25 are discharged from the low-temperature evaporator 21 through pipe 38 to the leaching tank 19. Within the leaching tank 19, as hereinbefore stated, the salts settle to the bottom after the liquid phase accompanying the salts has been thoroughly diluted by the clear liquor entering through pipe 18. The lithium-sulfate materials are removed through pipe 39 to a filtering device such as centrifugal 40. The filtrate from this centrifugal is removed through pipe 41 and returned to the low-temperature evaporator 21. Within the centrifugal, the cake of lithium-sulfate materials is washed with water through pipe 42 and this wash water is also returned to the low-temperature evaporator 21 through pipe 41. Finally the moist cake of lithium-sulfate materials is discharged, as indicated by the arrow 43, and may be dried, or sold, or otherwise used.

While the particular forms of the invention herein described are well adapted to carry out the objects of the present invention, various modifications and changes may be made, and this invention includes all such modifications and changes as come within the scope of the appended claims.

I claim:

1. A process for producing a lithium sulfate and phosphoric acid from a lithium-phosphate material selected from the group consisting of lithium phosphates, lithium-sodium phosphates and mixtures of lithium phosphates and lithium-sodium phosphates, which process comprises, reacting the lithium phosphate material with sulfuric acid in the presence of water to form a solution containing lithium sulfate and phosphoric acid, partially evaporating said solution while crystallizing lithium sulfate from the produced solution and forming a phosphoric acid solution, and separating the crystallized lithium sulphate from the produced phosphoric acid solution, the evaporation of such solution being carried out in two stages, from each of which the crystallized lithium sulfate is separated, the crystallized lithium sulfate from the second stage of evaporation being returned to the solution undergoing evaporation in the first evaporation stage.

2. A process of producing a lithium sulfate and phosphoric acid from a lithium-phosphate material selected from the group consisting of lithium phosphates, lithium-sodium phosphates and mixtures of lithium phosphates and lithium-sodium phosphates, which process comprises, reacting the lithium phosphate material with sulfuric acid in the presence of water to form a solution containing lithium sulfate and phosphoric acid, partially evaporating said solution while crystallizing lithium sulfate from the produced solution and forming a phosphoric acid solution, and separating the crystallized lithium sulfate from the produced phosphoric acid solution, the evaporation being conducted so that a phosphoric acid solution about 70% in strength is produced.

3. A process of producing lithium-sodium sulfate material and a concentrated phosphoric acid solution from a lithium phosphate material selected from the group consisting of lithium phosphate, lithium-sodium phosphate and mixtures of lithium phosphate and lithium-sodium phosphate, which process comprises, treating the lithium sulfate material with sulfuric acid in the presence of water to form a solution containing lithium sulfate and phosphoric acid, subjecting the resulting solution to evaporation conducted in two successive stages while crystallizing lithium sulfate materials in said stages and producing a residual concentrated phosphoric acid solution, returning the crystallized lithium sulfate from the second evaporation stage to the solution undergoing evaporation in the first evaporating stage, withdrawing a sludge of crystallized material from the first evaporating stage, separating the crystallized material so withdrawn from the resulting liquor, and returning said resulting liquor to the evaporating stages.

4. A process of producing lithium-sodium sulfate material in a concentrated phosphoric acid solution from a lithium phosphate material selected from the group consisting of lithium phosphate, lithium-sodium phosphate and mixtures of lithium phosphate and lithium-sodium phosphate, which process comprises, treating the lithium phosphate material with sulfuric acid in the presence of water to form a solution containing lithium sulfate and phosphoric acid, subjecting such solution to evaporation conducted in two successive stages while crystallizing the lithium sulfate in said stages, returning the crystallized material from the second evaporating stage to the first evaporating stage, and removing from the first evaporating stage the crystallized material, the first evaporating stage being conducted to concentrate the phosphoric acid solution to about 30-40% phosphoric acid and the second evaporating stage being conducted to concentrate the phosphoric acid to 70% in strength.

5. A process of producing lithium-sodium sulfate material in a concentrated phosphoric acid solution from a lithium phosphate material selected from the group consisting of lithium phosphate, lithium-sodium phosphate and mixtures of lithium phosphate and lithium-sodium phosphate, which process comprises, reacting the lithium phosphate material with sulfuric acid in the presence of water to produce a solution containing lithium sulfate and phosphoric acid, subjecting such solution to evaporation while precipitating the lithium sulfate and producing a concentrated solution of phosphoric acid, separating a sludge containing the lithium sulfate crystals and adhering phosphoric acid solution from the material undergoing evaporation, treating the sludge with a solvent of phosphoric acid and water in which the crystallized material is insoluble, and separating the crystallized material from the solvent and phosphoric acid solution.

6. A process of producing lithium-sodium sulfate material in a concentrated phosphoric acid solution from a lithium phosphate material selected from the group consisting of lithium phosphate, lithium-sodium phosphate and mixtures of lithium phosphate and lithium-sodium phosphate, which process comprises, reacting the lithium phosphate material with sulfuric acid in the presence of water to produce a solution containing lithium sulfate and phosphoric acid, subjecting such solution to evaporation while precipitating the lithium sulfate and producing a concentrated solution of phosphoric acid, separating a sludge containing the lithium sulfate crystals and adhering phosphoric acid solution from the material undergoing evaporation, treating the sludge with a solvent of phosphoric acid and water in which the crystallized material is insoluble, and separating the crystallized material from the solvent and phosphoric acid solution, the solvent being methyl alcohol.

FRANK HENDERSON MAY.

REFERENCES CITED

The following references are of record in the file of this patent:

UNITED STATES PATENTS

| Number | Name | Date |
| --- | --- | --- |
| 24,931 | Genth | Aug. 2, 1859 |
| 1,270,515 | Haslup | June 25, 1918 |
| 1,499,611 | Gravell | July 1, 1924 |
| 1,836,694 | Wadsted | Dec. 15, 1931 |
| 1,838,431 | Milligan | Dec. 29, 1931 |
| 1,894,289 | Wood | Jan. 17, 1933 |
| 1,894,514 | Hechenbleikner | Jan. 17, 1933 |
| 2,174,158 | Kepfer et al. | Sept. 26, 1939 |

FOREIGN PATENTS

| Number | Country | Date |
| --- | --- | --- |
| 424,757 | Great Britain | Feb. 27, 1935 |

OTHER REFERENCES

Hess, "Lithium," U. S. Bureau of Mines Information Circular No. 7054, February 1939, page 11.